United States Patent Office 3,288,848
Patented Nov. 29, 1966

3,288,848
α-AMINO DIBASIC ACID HYDRAZIDES
Jack W. Hinman, Portage, and Ronald B. Kelly, Cooper Township, Kalamazoo County, Mich., assignors to The Upjohn Company, Kalamazoo, Mich., a corporation of Delaware
No Drawing. Filed Dec. 21, 1964, Ser. No. 420,137
3 Claims. (Cl. 260—518)

This application is a continuation-in-part of application Serial No. 129,222, filed August 4, 1961, now abandoned.

The present invention is directed to novel α-amino dibasic acid hydrazides, to a novel process for the preparation of α-amino dibasic acid hydrazides, and to novel intermediates utilized in the preparation of the hydrazides.

The novel α-amino diasic acid hydrazides of the present invention can be represented by the formula:

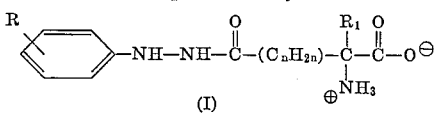
(I)

wherein R represents hydrogen, carboxy, alkyl of 1 to 4 carbon atoms, inclusive, e.g., methyl, ethyl, propyl, isopropyl, butyl, isobutyl, and the like, halogen, e.g., bromo, chloro, fluoro, and iodo, and alkoxy of 1 to 4 carbon atoms, inclusive, e.g., methoxy, ethoxy, propoxy, isopropoxy, butoxy, isobutoxy, and the like; $R_1$ represents hyrrogen and alkyl of 1 to 4 carbon atoms, inclusive, e.g., methyl, ethyl, propyl, butyl, isopropyl, isobutyl, and the like, and $n$ is an integer from zero to 7, inclusive. The structural formula has been written in zwitter-ion form, as is commonly done in the case of α-amino acids.

As is evident from Formula I, the compounds of the present invention can exist in different sterioisomeric configurations due to the presence of the asymmetric carbon atom in the 2-position, i.e., the carbon atom to which the amino group is attached. It is, therefore, to be understood that the L-, the D-, and the DL-forms are within the scope of the present invention.

The α-amino dibasic acid hydrazides prepared by the novel process of the present invention are potent inhibitors of 5-hydroxytryptophan decarboxylase, the enzyme system which is responsible for the conversion of 5-hydroxytryptophan to serotonin in the body [Udenfriend et al., J. Biol. Chem. 224, 803 (1957)]. 5-hydroxytryptophan is known to be the precursor of serotonin released in the brain [serotonin itself does not cross the blood-brain barrier; see Fed. Proc. 15, 402 and 493 (1957)]. While the precise role which serotonin plays in the complex series of chemical reactions occurring in the brain, both normal and abnormal, is not yet clear, it is becoming increasingly evident that serotonin does have a significant effect on the manner in which the brain functions. The α-amino dibasic acid hydrazides of the present invention thus provide a regulator for the supply of serotonin to the brain and can thus be utilized in reducing hyperactivity in animals and making them more suitable for handling and transportation purposes.

The aforesaid inhibitory activity of α-amino dibasic acid hydrazides of the present invention also makes them valuable as laboratory agents. Thus, they can be used in the research laboratory to inhibit selectively 5-hydroxytryptophan decarboxylase in mixed enzyme systems. They can also be used in the characterization and quantitative determination of 5-hydroxytryptophan decarboxylase in the laboratory.

L-glutamic acid 5-[2-(α-hydroxy-p-tolyl)hydrazide], an α-amino dibasic acid hydrazide, has been disclosed by Levenberg [J. Amer. Chem. Soc. 83, 503 (1961)] who proposed the trivial name "agaritine," which will be used hereinafter. Agaritine has the following structural formula:

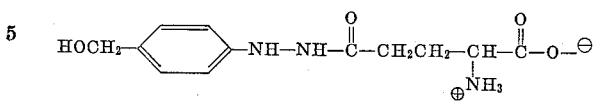

Agaritine has heretofore been available only from mushrooms of the genus Agaricus and, more particularly, from the press juice of *Agaricus bisporus*, the common mushroom of commerce in the United States.

In view of the fact that agaritine has been available only from the mushroom source, ample quantities of the product have been difficult to obtain. The process of the present invention thus provides a novel chemical process for the preparation of agaritine and novel α-amino dibasic acid hydrazides having Formula I above.

The novel process of the present invention involves reacting an azide having the formula:

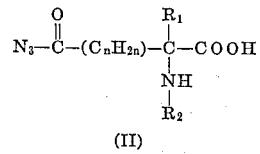
(II)

wherein $R_1$ and $n$ have the values represented above and $R_2$ represents an amino protective group, e.g., carbobenzlyoxy

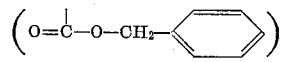

carboallyloxy

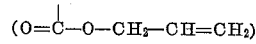

and tosyl

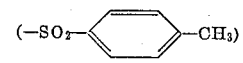

with a phenylhydrazine having the formula:

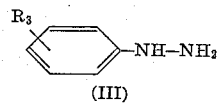
(III)

wherein $R_3$ represents hydrogen, methylol, carboxy, alkyl of 1 to 4 carbon atoms, inclusive, e.g., methyl, ethyl, propyl, isopropyl, butyl, isobutyl, and the like; halogen, e.g., bromo, chloro, fluoro, and iodo, and alkoxy of 1 to 4 carbon atoms, inclusive, e.g., methoxy, ethoxy, propoxy, isopropoxy, butoxy, isobutoxy, and the like, to produce a novel arylhydrazide intermediate having the formula:

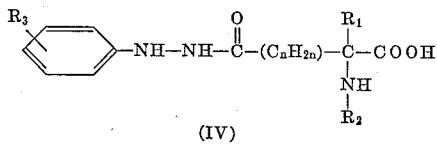
(IV)

wherein $R_1$, $R_2$, $R_3$ and $n$ have the values represented above, and then removing the amino protective group ($R_2$) from the novel arylhydrazide intermediate (Formula IV), to produce an α-amino dibasic acid hydrazide having the formula:

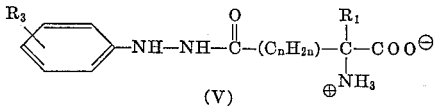
(V)

wherein $R_1$, $R_3$ and $n$ have the values represented above. Removal of the amino protective group ($R_2$) can be carried out by any means known in the art, e.g., by catalytic hydrogenolysis in the case of carbobenzyloxy and carboallyloxy, and with sodium and liquid ammonia in the case of tosyl.

The azides (Formula II) can be prepared according to conventional procedure as disclosed in U.S. Patent 2,723,973. For example, L - N - carbobenzyloxyglutamic acid 5-azide is prepared by reacting 5-ethyl L-glutamate hydrochloride with benzyl chloroformate to produce 5-ethyl L - N - carbobenzyloxyglutamate, reacting the latter compound with hydrazine hydrate to produce L-N-carbobenzyloxyglutamic acid 5-hydrazide, which when reacted with nitrous acid (generated in situ with sodium nitrite and hydrochloric acid) results in the preparation of L-N-carbobenzyloxyglutamic acid 5-azide.

By substituting other ω-alkyl esters of α-amino dibasic acids (i.e., monoalkyl esters in which the carboxyl group farthest removed from the amino group is esterfied) in the process of U.S. Patent 2,723,973, such as the ω-methyl and ω-ethyl esters of aminomalonic acid, aspartic acid, 2 - methylaspartic acid, 3,3 - dimethylaspartic acid, 2-propylaspartic acid, 3-butylaspartic acid, 3-methylaspartic acid, 2-methylglutamic acid, 3-methylglutamic acid, 4-methylglutamic acid, 2-aminohexanedioic acid, 2-aminoheptanedioic acid, 2-aminooctanedioic acid, 2-aminononanedioic acid, and 2-aminodecanedioic acid for 5-ethyl L-glutamate, the following hydrazides and azides, respectively, are prepared:

N-carbobenzyloxyaminomalonic acid hydrazide, N-carbobenzyloxyaspartic acid 4-azide;
N-carbobenzyloxyaspartic acid 4-hydrazide, N-carbobenzyloxyaspartic acid 4-azide;
N-carbobenzyloxy-2-methylaspartic acid 4-hydrazide, N-carbobenzyloxy-2-methylaspartic acid 4-azide;
N-carbobenzyloxy-3,3-dimethylaspartic acid 4-hydrazide, N-carbobenzyloxy-3,3-dimethylaspartic acid 4-azide;
N-carbobenzyloxy-2-propylaspartic acid 4-hydrazide, N-carbobenzyloxy-2-propylaspartic acid 4-azide;
N-carbobenzyloxy-3-butylaspartic acid 4-hydrazide, N-carbobenzyloxy-3-butylaspartic acid 4-azide;
N-carbobenzyloxy-3-methylaspartic acid 4-hydrazide, N-carbobenzyloxy-3-methylaspartic acid 4-azide;
N-carbobenzyloxy-2-methylglutamic acid 5-hydrazide, N-carbobenzyloxy-2-methylglutamic acid 5-azide;
N-carbobenzyloxy-3-methylglutamic acid 5-hydrazide, N-carbobenzyloxy-3-methylglutamic acid 5-azide;
N-carbobenzyloxy-4-methylglutamic acid 5-hydrazide, N-carbobenzyloxy-4-methylglutamic acid 5-azide;
N-carbobenzyloxy-2-aminohexanedioic acid 6-hydrazide, N-carbobenzyloxy-2-aminohexanedioic acid 6-azide;
N-carbobenzyloxy-2-aminoheptanedioic acid 7-hydrazide, N-carbobenzyloxy-2-aminoheptanedioic acid 7-azide;
N-carbobenzyloxy-2-aminooctanedioic acid 8-hydrazide, N-carbobenzyloxy-2-aminooctanedioic acid 8-azide;
N-carbobenzyloxy-2-aminononanedioic acid 9-hydrazide, N-carbobenzyloxy-2-aminononanedioic acid 9-azide;
N-carbobenzyloxy-2-aminodecanedioic acid 10-hydrazide, N-carbobenzyloxy-2-aminodecanedioic acid 10-azide.

By employing the foregoing ω-alkyl esters of α-amino dibasic acids in the process of U.S. Patent 2,723,973, but substituting allyl chloroformate and p-toluenesulfonyl chloride (tosyl chloride) for benzyl chloroformate, the following hydrazides and azides are prepared:

N-carboallyloxyglutamic acid 5-hydrazide, N-tosylglutamic acid 5-hydrazide, N-carboallyloxyglutamic acid 5-azide, N-tosylglutamic acid 5-azide;
N-carboallyloxyaminomalonic acid hydrazide, N-tosylaminomalonic acid hydrazide, N-carboallyloxyaminomalonic acid azide, N-tosylaminomalonic acid azide;
N-carboallyloxyaspartic acid 4-hydrazide, N-tosylaspartic acid 4-hydrazide, N-carboallyloxyaspartic acid 4-azide, N-tosylaspartic acid 4-azide;
N-carboallyloxy-2-methylaspartic acid 4-hydrazide, N-tosyl-2-methylaspartic acid 4-hydrazide, N-carboallyloxy-2-methylaspartic acid 4-azide, N-tosyl-2-methylaspartic acid 4-azide;
N-carboallyloxy-3,3-dimethylaspartic acid 4-hydrazide, N-tosyl-3,3-dimethylaspartic acid 4-hydrazide, N-carboallyloxy-3,3-dimethylaspartic acid 4-azide, N-tosyl-3,3-dimethylaspartic acid 4-azide;
N-carboallyloxy-2-propylaspartic acid 4-hydrazide, N-tosyl-2-propylaspartic acid 4-hydrazide, N-carboallyloxy-2-propylaspartic acid 4-azide, N-tosyl-2-propylaspartic acid 4-azide;
N-carboallyloxy-3-butylaspartic acid 4-hydrazide, N-tosyl-3-butylaspartic acid 4-hydrazide, N-carboallyloxy-3-butylaspartic acid 4-azide, N-tosyl-3-butylaspartic acid 4-azide;
N-carboallyloxy-3-methylaspartic acid 4-hydrazide, N-tosyl-3-methylaspartic acid 4-hydrazide, N-carboallyloxy-3-methylaspartic acid 4-azide, N-tosyl-3-methylaspartic acid 4-azide;
N-carboallyloxy-2-methylglutamic acid 5-hydrazide, N-tosyl-2-methylglutamic acid 5-hydrazide, N-carboallyloxy-2-methylglutamic acid 5-azide, N-tosyl-2-methylglutamic acid 5-azide;
N-carboallyloxy-3-methylglutamic acid 5-hydrazide, N-tosyl-3-methylglutamic acid 5-hydrazide, N-carboallyloxy-3-methylglutamic acid 5-azide, N-tosyl-3-methylglutamic acid 5-azide;
N-carboallyloxy-4-methylglutamic acid 5-hydrazide, N-tosyl-4-methylglutamic acid 5-hydrazide, N-carboallyloxy-4-methylglutamic acid 5-azide, N-tosyl-4-methylglutamic acid 5-azide;
N-carboallyloxy-2-aminohexanedioic acid 6-hydrazide, N-tosyl-2-aminohexanedioic acid 6-hydrazide, N-carboallyloxy-2-aminohexanedioic acid 6-azide, N-tosyl-2-aminohexanedioic acid 6-azide;
N-carboallyloxy-2-aminoheptanedioic acid 7-hydrazide, N-tosyl-2-aminoheptanedioic acid 7-hydrazide, N-carboallyloxy-2-aminoheptanedioic acid 7-azide, N-tosyl-2-aminoheptanedioic acid 7-azide;
N-carboallyloxy-2-aminooctanedioic acid 8-hydrazide, N-tosyl-2-aminooctanedioic acid 8-hydrazide, N-carboallyloxy-2-aminooctanedioic acid 8-azide, N-tosyl-2-aminooctanedioic acid 8-azide;
N-carboallyloxy-2-aminononanedioic acid 9-hydrazide, N-tosyl-2-aminononanedioic acid 9-hydrazide, N-carboallyloxy-2-aminononanedioic acid 9-azide, N-tosyl-2-aminononanedioic acid 9-azide;
N-carboallyloxy-2-aminodecanedioic acid 10-hydrazide, N-tosyl-2-aminodecanedioic acid 10-hydrazide, N-carboallyloxy-2-aminodecanedioic acid 10-azide, and N-tosyl-2-aminodecanedioic acid 10-azide.

Generally speaking, the azides (Formula II) are not particularly stable. Therefore, it is preferred not to isolate them, but to prepare solutions of them (e.g., ether or chloroform solutions), which are then used in further synthesis as soon thereafter as is practicable.

In carrying out the process of the present invention, the azide (Formula II) is reacted with the phenylhydrazine (Formula III) in the presence of an inert solvent, e.g., ether, ethyl acetate, chloroform, methylene chloride, and the like. The reaction is advantageously carried out at a temperature between about −15° C. and about 10° C., preferably between about −5° C. and about 0° C. Upon completion of the reaction, the resulting novel arylhydrazide intermediate (Formula IV) can be isolated and purified if so desired, using conventional techniques, such as filtration, solvent extraction, evaporation, recrystallization, and the like.

The novel arylhydrazide intermediate is then subjected to hydrolysis or hydrogenolysis to remove the protective group ($R_2$ in Formula IV) and thus obtain the desired α-amino dibasic acid hydrazide (Formula V).

Preferably, the carbobenzyloxy protective group is removed by catalytic hydrogenolysis utilizing a palladium catalyst, such as palladium-barium sulfate, palladium-charcoal, palladium black, and the like, with a 10% palladium-charcoal catalyst being preferred. Other concentrations between about 1% and 50% can also be employed, with a somewhat shorter reaction time being required at the higher concentrations. Inert solvents in which the hydrogenolysis can be carried out include, among others, lower alkanols, such as aqueous or anhydrous methanol, ethanol, and isopropanol. After the hydrogenolysis has been completed, the resulting α-amino dibasic acid hydrazide (Formula V) can be isolated and purified by means of conventional techniques, such as filtration to remove the catalyst, chromatography, removal of solvent, recrystallization, and the like. Sodium and liquid ammonia, phosphonium iodide, and hydrogen halides in glacial acetic acid can also be employed to remove the carbobenzyloxy group as disclosed in U.S. Patent 2,723,973.

Preferably, the carboallyloxy protective group is removed by catalytic hydrogenolysis using platinum oxide catalyst in acidified ethanol as disclosed by Milne et al., J. Amer. Chem. Soc. 79, 637–39, 1957. This process can also be employed to remove the carbobenzyloxy protective group.

Preferably, the tosyl protective group is removed with sodium and liquid ammonia as disclosed by Milne et al., J. Amer. Chem. Soc. 79, 639–44, 1957. Alternatively, it can be removed by other procedures disclosed by the same authors, e.g., by means of Raney nickel, or hydriodic acid in glacial acetic acid, or hydrobromic acid and phenol.

The following examples are illustrative of the process and products of the present invention, but are not to be construed as limiting.

EXAMPLE 1.—L-GLUTAMIC ACID 5-(2-PHENYLHYDRAZIDE)

A. *L-N-carbobenzyloxyglutamic acid 5-hydrazide*

To a stirred solution of 53.4 g. of 5-methyl L-glutamate, 59 g. of sodium bicarbonate, and 720 ml. of water, cooled to 0–5° C. in an ice bath, was added 60 ml. of benzyl chloroformate over a period of 25 minutes. Stirring and cooling was continued for 1.5 hours, the cooling bath was removed, and the mixture was stirred for an additional 2 hours. The mixture was extracted with three 700-ml. portions of ether, acidified with concentrated hydrochloric acid, and extracted with three 1000-ml. portions of ethyl acetate. The extracts were washed with 250 ml. of water containing 1.5 g. of sodium bicarbonate, combined, and evaporated to a syrup under reduced pressure. The syrup was crystallized twice from carbon tetrachloride to produce 40 g. of 5-methyl L-N-carbobenzyloxyglutamate melting at 70° C.

17.0 g. of 5-methyl L-N-carbobenzyloxyglutamate was dissolved in 40 ml. of absolute ethanol and the solution was treated, with cooling, with 18 ml. of hydrazine hydrate (99–100%). The reaction mixture was left in a stoppered flask at 25° C. for 48 hours. It was then concentrated under reduced pressure at 38° C. to 15 ml. Water (130 ml.) was added to the residue and the aqueous solution was cooled in an ice bath while being treated with concentrated hydrochloric acid. When the solution became acidic, the product crystallized, was collected on a funnel and washed with water, methanol and ether. The dried product, L-N-carbobenzyloxyglutamic acid 5-hydrazide, weighed 13.0 g. and melted at 179–180° C.

*Analysis.*—Calcd. for $C_{13}H_{17}N_3O_5$: C, 52.97; H, 5.80; N, 14.23. Found: C, 52.71; H, 5.62; N, 14.72.

B. *L-N-carbobenzyloxyglutamic acid 5-azide*

A solution of 54.4 g. (0.18 mole) of L-N-carbobenzyloxyglutamic acid 5-hydrazide in 300 ml. of 3 N hydrochloric acid and 100 ml. of water was cooled in an ice bath. The cooled solution was covered with cold (−10° C.) ether and the mixture was stirred while a cold solution of 15.2 g. (0.22 mole) of sodium nitrite in 100 ml. of water was added over a period of 15 min. The lower layer was separated and extracted with two 1.0-l. portions of cold (−10° C.) ether. The ether extracts were washed with two 500-ml. portions of ice water, combined, and dried briefly over anhydrous sodium sulfate. There was thus obtained a cold (0° C.) ether solution of L-N-carbobenzyloxyglutamic acid 5-azide.

C. *L-N-carbobenzyloxyglutamic acid 5-(2-phenylhydrazide)*

The above ether solution of L-N-carbobenzyloxyglutamic acid 5-azide was added portionwise with stirring over a period of 20 minutes to a solution of 43.2 g. (0.40 mole) of phenylhydrazine in 500 ml. of ether cooled in an ice bath. The reaction mixture was cooled in the ice bath for 8 hours and then kept at 25° C. for 8 hours. The resulting precipitate (76.2 g.) was collected and washed with ether and was then dissolved in a mixture of 1000 ml. of ethyl acetate and 500 ml. of 1 N sulfuric acid. The layers were separated and the aqueous layer was extracted with two 1000-ml. portions of ethyl acetate. The ethyl acetate extracts were washed with two 500-ml. portions of 1 N sulfuric acid, then with two 250-ml. portions of water. The original ethyl acetate layer and the ethyl acetate extracts were dried over anhydrous sodium sulfate, combined, and evaporated under reduced pressure at 38° C. to a thick syrup which was crystallized from 60% methanol. The yield of crystalline material, L-N-carbobenzyloxyglutamic acid 5-(2-phenylhydrozide), was 47.3 g. (70%). The product, after being recrystallized from ethanol-water (65%), melted at 70–80° C., slowly resolidified between 100–140° C., and finally melted at 148–149° C.

*Analysis.*—Calcd. for $C_{19}H_{21}N_3O_5$: C, 61.44; H, 5.70; N, 11.32. Found: C, 61.12; H, 5.86; N, 11.25.

D. *L-glutamic acid 5-(2-phenylhydrazide)*

A solution of 5.0 g. of L-N-carbobenzyloxyglutamic acid 5-(2-phenylhydrazide) in 200 ml. of 50% methanol was hydrogenolyzed in the presence of 500 mg. of palladium-charcoal catalyst (10%) for one hour at 18 p.s.i. (gauge). The catalyst was removed by filtration and washed well with warm 50% methanol and warm water. The combined washings and filtrate (1.0 l.) were evaporated under reduced pressure at 36° C. to a volume of 300 ml., then extracted with 200-ml. portions of methylene chloride, ethyl acetate, and ether. The extracted aqueous solution was concentrated under reduced pressure at 38° C. to a volume of 100 ml. Ethanol (100 ml.) was added to the concentrate and 1.99 g. (57%) of crystalline product, L-glutamic acid 5-(2-phenylhydrazide), was obtained. An analytical sample prepared by two recrystallizations from 50% ethanol melted at 203° C.; $[\alpha]_D^{25}$ +24° (c.=0.41 in 0.5 N hydrochloric acid).

*Analysis.*—Calcd. for $C_{11}H_{15}N_3O_3$: C, 55.68; H, 6.37; N, 17.71. Found: C, 55.50; H, 6.16; N, 17.73.

Following the procedure of Example 1, but starting with 5-methyl D-glutamate instead of 5-methyl L-glutamate, the following compounds are obtained: 5-methyl D-N-carbobenzyloxyglutamate and D-N-carbobenzyloxyglutamic acid 5-hydrazide in Part A; D-N-carbozenzyloxyglutamic acid 5-azide (ether solution) in Part B; D-N-carbobenzyloxyglutamic acid 5-(2-phenylhydrazide) in Part C; and D-glutamic acid 5-(2-phenylhydrazide) in Part D.

In like manner, but starting with 5-methyl D,L-glutamate, the corresponding derivatives of D,L-glutamic acid are obtained.

EXAMPLE 2.—L-GLUTAMIC ACID 5-(2-p-TOLYLHYDRAZIDE)

A. *L-N-carbobenzyloxyglutamic acid 5-(2-p-tolylhydrazide)*

An ether solution of L-N-carbobenzyloxyglutamic acid 5-azide was prepared from 21.5 g. of L-N-carbenzyloxyglutamic acid 5-hydrazide in the manner described in Example 1, and stored in an acetone-solid carbon dioxide bath. The solution was added, over a period of one hour, to a stirred solution of 18.3 g. (0.15 mole) of p-tolylhydrazine in 250 ml. of ether. During the addition of the azide solution, the p-tolylhydrazine solution was cooled in an ice bath. The ice bath was removed and the reaction mixture was kept at 25° C. for 22 hours. The precipitate which formed was collected, washed well with ether, and dissolved in a mixture of 1.0 l. of methylene chloride and 500 ml. of 1 N hydrochloric acid. The aqueous layer was separated and extracted with four 1.0-l. portions of methylene chloride. The methylene chloride extracts were washed with 500 ml. of 1 N hydrochloric acid and with two 500-ml. portions of water. The combined methylene chloride extracts and original methylene chloride layer were evaporated under reduced pressure at 36° C. The residue was crystallized from 75% methanol to yield 15.0 g. of L-N-carbobenzlyoxyglutamic acid 5-(2-p-tolylhydrazide). Upon recrystallization from methanol-ether, then from 80% ethanol, an analytical sample which was solvated with ethanol had a melting point of 153–155° C.

*Analysis.*—Calcd. for $C_{20}H_{12}N_2O_5 \cdot CH_3CH_2OH$: C, 61.24; H, 6.77; N, 9.74. Found: C, 61.16; H, 6.18; N, 10.01.

In the same manner as shown in Example 2, Part A, L - N - carbobenzyloxyglutamic acid 5-(2-o-ethylphenylhydrazide), L - N-carbobenzyloxyglutamic acid 5-(2-m-propylphenylhydrazide), L - N-carbobenzyloxyglutamic acid 5-(2-p-butylphenylhydrazide), L - N - carbobenzyloxyglutamic acid 5-(2-o-isopropylphenylhydrazide), and L-N-carbobenzyloxyglutamic acid 5-(2-m-isobutylphenylhydrazide) are prepared by using o-ethylphenylhydrazine, m - propylphenylpydrazine, p - butylphenylhydrazine, o-isopropylphenylhydrazine, and m-isobutylphenylhydrazine, respectively, instead of p-tolylhydrazine.

B. *L-glutamic acid 5-(2-p-tolylhydrazide)*

A solution of 3.85 g. (0.01 mole) of L-N-carbobenzyloxyglutamic acid 5-(2-p-tolylhydrazide) in 250 ml. of 60% ethanol was hydrogenolyzed in the presence of 250 mg. of palladium-charcoal catalyst (10%) for one hour at 17 p.s.i. (gauge). The catalyst was removed by filtration and washed with warm water. The combined filtrate and washings were evaporated under reduced pressure at 38° C. to a volume of 100 ml. Water (150 ml.) was added to dissolve the resulting precipitate and the aqueous solution was extracted with two 150-ml. portions of ethyl acetate and then with 150 ml. of ether. The organic extracts were washed with two 100-ml. portions of water. The extracted aqueous solution and washings were combined and evaporated under reduced pressure at 38° C. to a volume of 200 ml. Ethanol (200 ml.) was added and the resulting solution deposited 1.40 g. of product when cooled in the refrigerator. An additional 0.54 g. of product was obtained from the mother liquors by concentration to 75 ml. and addition of 30 ml. of ethanol and 100 ml. of n-butyl alcohol. The yield of crystalline product, L-glutamic acid 5-(2-p-tolylhydrazide), was 77% and the product melted at 183–184° C.; $[\alpha]_D^{25}$ +25° (c·=0.88 in 0.5 N hydrochloric acid).

*Analysis.*—Calcd. for $C_{12}H_{17}N_3O_3$: C, 57.29; H, 6.82; N, 16.71; O, 19.18. Found: C, 57.42; H, 6.69; N, 16.25; O, 19.34.

In the same manner as shown in Example 2, Part B, L-glutamic acid 5 - (2-o-ethylphenylhydrazide), L-glutamic acid 5 - (2-m-propylphenylhydrazide), L-glutamic acid 5-(2-p-butylphenylhydrazide), L-glutamic acid 5-(2-o-isopropylphenylhydrazide), and L-glutamic acid 5-(2-m-isobutylphenylhydrazide) are prepared by using L-N-carbobenzyloxyglutamic acid 5 - (2 - o-ethylphenylhydrazide), L - N-carbobenzyloxyglutamic acid 5-(2-m-propylphenylhydrazide), L - N-carbobenzyloxyglutamic acid 5-(2-p-butylphenylhydrazide), L-N-carbobenzyloxyglutamic acid 5-(2-o-isopropylphenylhydrazide), and L-N-carbobenzyloxyglutamic acid 5-(2-m-isobutylphenylhydrazide), respectively, instead of L-N-carbobenzyloxyglutamic acid 5-(2-p-tolylhydrazide).

EXAMPLE 3.—L - GLUTAMIC ACID 5 - [2-(α-HYDROXY-p-TOLYL)HYDRAZIDE] (AGARITINE)

A. *p-Carbomethoxyphenylhydrazine*

A solution of 20.0 g. of p-carboxyphenylhydrazine in 200 ml. of absolute methanol and 20 ml. of concentrated sulfuric acid was heated under reflux for one hour. The solution was concentrated under reduced pressure to a volume of 75 ml. and 400 g. of ice was added to the residue. The resulting solution was cooled to −10° C. in an ice-salt bath while being treated with 30% aqueous sodium hydroxide solution. The product crystallized when the solution became strongly alkaline and it was promptly collected on a funnel and washed with ice-water until neutral. The dried product weighed 14.3 g. (66%). On recrystallization from ether, with charcoal treatment, the product, p-carbomethoxyphenylhydrazine, melted at 110° C. (dec.).

*Analysis.*—Calcd. for $C_8H_{10}N_2O_2$: N, 16.86. Found: N, 16.78.

B. *α-Hydroxy-p-tolylhydrazine*

A solution of 2.08 g. (0.0125 mole) of p-carbomethoxyphenylhydrazine in 125 ml. of ether (freshly distilled over lithium aluminum hydride) was added to a boiling suspension of lithium aluminum hydride (1.00 g.) in 25 ml. of dry ether over a period of 10 minutes. The reaction mixture was stirred under reflux for 1.5 hours, then allowed to remain at 25° C. for 30 minutes. The apparatus was flushed with nitrogen while 5 ml. of saturated sodium chloride solution was added in one portion. Inorganic salts were collected by filtration of the mixture, resuspended in ether with anhydrous sodium sulfate, and again collected and washed with ether. The combined filtrates and washings were immediately cooled in an ice bath. The product in ether solution was α-hydroxy-p-tolylhydrazine (p-methylolphenylhydrazine).

C. *L-N-carbobenzyloxyglutamic acid 5-azide*

A solution of 1.77 g. (0.006 mole) of L-N-carbobenzyloxyglutamic acid 5-hydrazide in 25 ml. of 3 N HCl was cooled in an ice bath and then covered with 150 ml. of cold (−10° C.) ether. The cold mixture was stirred while being treated with a cold solution of 0.580 g. (0.008 mole) of sodium nitrite in 25 ml. of water over a period of 10 minutes. The lower layer was separated and extracted with two 100-ml. portions of cold (−10° C.) ether. The ether extracts containing L-N-carbobenzyloxyglutamic acid 5-azide were washed with two 75-ml. portions of ice water, then combined and stored in an acetone-solid carbon dioxide bath.

D. *L-N-carbobenzyloxyglutamic acid 5-[2-(α-hydroxy-p-tolyl)hydrazide]*

The washed ether extracts of Part C were added to the ether solution of α-hydroxy-p-tolylhydrazine of Part B over a period of 60 minutes. The reaction mixture was stirred in an ice bath under nitrogen and then was maintained at a temperature of 25° C. for two hours. The resulting product in ether solution was L-N-carbobenzyloxyglutamic acid 5-[2-(α-hydroxy-p-tolyl)hydrazide].

E. *L-glutamic acid 5-[2-(α-hydroxy-p-tolyl)hydrazide] (agaritine)*

The ether solution of L-N-carbobenzyloxyglutamic acid 5-[2-(α-hydroxy-p-tolyl)hydrazide] obtained in Part D was evaporated under reduced pressure at 30° C. almost to dryness. The residue was added to 40 ml. of methanol and 25 ml. of water and the resulting solution was hydrogenolyzed in the presence of 350 mg. of palladium-charcoal catalyst (10%) for one hour at 15 p.s.i. (gauge). The catalyst was removed by filtration and washed with 50 ml. of warm 50% methanol. The combined filtrate and washings were evaporated under reduced pressure at 30° C. to a volume of 10 ml. The concentrate was diluted with 50 ml. of water. The resulting solution was extracted with two 30-ml. portions of ethyl acetate and then with two 30-ml. portions of ether.

A column (4 in. x 22 in.) was charged with 5 l. of Dowex 50, a sulfonated styrene copolymer cation-exchange resin prepared by sulfonation of copolymers of styrene and sold by Dow Chemical Company. The resin was converted to the ammonium phase by passage of dilute ammonium hydroxide through the column, after which the resin was washed with deionized water until the pH of the effluent was approximately 7.0. The above aqueous solution, after extraction with ethyl acetate and ether as described, was applied to the column, which was then eluted with deionized water. After a forerun of 2.0 l., fractions of 500 ml. volume were collected and the ultraviolet absorption spectrum of each fraction was taken. Fractions 15, 16, and 17, having λ max. 236 and 280 mμ, were combined and evaporated under reduced pressure at 40° C. to a volume of 7 ml. n-Butyl alcohol (25 ml.) was added and the mixture was evaporated under reduced pressure until a single phase resulted. This solution, left in the refrigerator, deposited 50 mg. (3%) of crystalline agaritine with M.P. 205–9° C. (dec.). This sample was identical with natural agaritine: it had λ max. 237 and 280 mμ, $[\alpha]_D^{25}$ +7.1° (c.=1.14 in water), infrared spectrum identical to natural agaritine, and behavior on papergrams identical to natural agaritine.

*Analysis.*—Calcd. for $C_{12}H_{17}N_3O_4$: C, 53.92; H, 6.41; N, 15.72. Found: C, 53.92; H, 6.57; N, 15.45.

Following the procedure of Example 1, Parts A and B, but starting with 4-methyl L-aspartate instead of 5-methyl L-glutamate, there is obtained a cold ether solution of L-N-carbobenzyloxyaspartic acid 4-azide. Following the procedure of Example 3, Parts D and E, but substituting a cold ether solution of L-N-carbobenzyloxyaspartic acid 4-azide for a cold ether solution of L-N-carbobenzyloxyglutamic acid 5-azide, there is obtained L-N-carbobenzyloxyaspartic acid 4-[2-(α-hydroxy-p-tolyl)hydrazide] which is converted by catalytic hydrogenolysis to L-aspartic acid 4-[2-(α-hydroxy-p-tolyl)hydrazide].

EXAMPLE 4.—L-GLUTAMIC ACID 5-(2-p-CARBOXYPHENYLHYDRAZIDE)

In the same manner as shown in Example 1, Parts C and D, L-glutamic acid 5-(2-p-carboxyphenylhydrazide) is prepared by using p-carboxyphenylhydrazine instead of phenylhydrazine to produce L-N-carbobenzyloxyglutamic acid 5-(2-p-carboxyphenylhydrazide) and subjecting the latter compound to hydrogenolysis.

EXAMPLE 5.—L-GLUTAMIC ACID 5-(2-p-CHLOROPHENYLHYDRAZIDE)

In the same manner as shown in Example 1, Parts C and D, L-glutamic acid 5-(2-p-chlorophenylhydrazide) is prepared by using p-chlorophenylhydrazine instead of phenylhydrazine to product L-N-carbobenzyloxyglutamic acid 5-(2-p-chlorophenylhydrazide) and subjecting the latter compound to hydrogenolysis.

Similarly, L-N-carbobenzyloxyglutamic acid 5-(2-p-bromophenylhydrazide), L - N - carbobenzyloxyglutamic acid 5 - (2-o-bromophenylhydrazide), L-N-carbobenzyloxyglutamic acid 5-(2-p-iodophenylhydrazide), and L-N-carbobenzyloxyglutamic acid 5-[2-(3,5-dichlorphenyl)hydrazide], are prepared by using p-bromophenylhydrazine, o - bromophenylhydrazine, p - iodophenylhydrazine, and 3,5-dichlorophenylhydrazine instead of p-chlorophenylhydrazine. Subjecting L - N - carbobenzyloxyglutamic acid 5-(2-p-bromophenylhydrazide), L-N-carbobenzyloxyglutamic acid 5-(2-o-bromophenylhydrazide), L-N-carbobenzyloxyglutamic acid 5-(2-p-iodophenylhydrazide), and L-N-carbobenzyloxyglutamic acid 5-[2-(3,5-dichlorophenyl)hydrazide] to hydrogenolysis results in the production of L-glutamic acid 5-(2-p-bromophenylhydrazide), L-glutamic acid 5-(2-o-bromophenylhydrazide), L-glutamic acid 5-(2-p-iodophenylhydrazide), and L-glutamic acid 5-[2-(3,5-dichlorophenyl)hydrazide], respectively.

EXAMPLE 6.—AMINOMALONIC ACID 2-o-METHOXYPHENYLHYDRAZIDE

A. *N-carbobenzyloxyaminomalonic acid 2-o-methoxyphenylhydrazide*

In the same manner as shown in Example 1, Parts A, B and C, N-carbobenzyloxyaminomalonic acid 2-o-methoxyphenylhydrazide is prepared by using methyl aminomalonate and o-methoxyphenylhydrazine instead of 5-methyl L-glutamate and phenylhydrazine, respectively.

B. *Aminomalonic acid 2-o-methoxyphenylhydrazide*

In the same manner as shown in Example 1, Part D, aminomalonic acid 2-o-methoxyphenylhydrazide is prepared by using N-carbobenzyloxyaminomalonic acid 2-o-methoxyphenylhydrazide instead of L-N-carbobenzyloxyglutamic acid 5-(2-phenylhydrazide).

Similarly, N-carbobenzyloxyaminomalonic acid 2-o-chlorophenylhydrazide, aminomalonic acid 2-o-chlorophenylhydrazide; N - carbobenzyloxyaminomalonic acid 2-o-tolylhydrazide, aminomalonic acid 2-o-tolylhydrazide; N-carbobenzyloxyaminomalonic acid 2-p-propoxyphenylhydrazide, aminomalonic acid 2-p-propoxyphenylhydrazide; N-carbobenzyloxyaminomalonic acid 2-p-iodophenylhydrazide and aminomalonic acid 2-p-iodophenylhydrazide are prepared by utilizing o-chlorophenylhydrazine, o-tolylhydrazine, p-propoxyphenylhydrazine, and p-iodophenylhydrazine instead of o-methoxyphenylhydrazine.

Subsituting allyl chloroformate and p-toluenesulfonyl chloride for benzyl chloroformate results in the production of N-carboallyloxyaminomalonic acid 2-o-methoxyphenylhydrazide, N-tosylaminomalonic acid 2-o-methoxyphenylhydrazide; N-carboallyloxyaminomalonic acid 2-o-chlorophenylhydrazide, N-tosylaminomalonic acid 2-o-chlorophenylhydrazide; N - carboallyloxyaminomalonic acid 2-o-tolylhydrazide, N-tosylaminomalonic acid 2-o-tolylhydrazide; N-carboallyloxyaminomalonic acid 2-p-propoxyphenylhydrazide, N-tosylaminomalonic acid 2-p-propoxyphenylhydrazide; N - carboallyloxyaminomalonic acid 2-p-iodophenylhydrazide, and N-tosylaminomalonic acid 2-p-iodo-phenylhydrazide.

EXAMPLE 7.—L-ASPARTIC ACID 4-(2-p-ETHOXYPHENYLHYDRAZIDE)

A. *L-N-carboallyloxyaspartic acid 4-(2-p-ethoxyphenylhydrazide)*

In the same manner as shown in Example 1, Parts A, B and C, L-N-carboallyloxyaspartic acid 4-2-p-ethoxyphenylhydrazide) is prepared by using allyl chloroformate, 4-methyl L-aspartate, and p-ethoxyphenylhydrazine instead of benzyl chloroformate, 5-methyl L-glutamate and phenylhydrazine, respectively.

B. *L-aspartic acid 4-(2-p-ethoxyphenylhydrazide)*

L-N-carboallyloxyaspartic acid 4-(2-p-ethoxyphenylhydrazide) is hydrogenolyzed in the presence of platinum oxide catalyst in acidified ethanol in accordance with the procedure described in J. Amer. Chem. Soc. 79, 637–39, 1957, to produce L-aspartic acid 4-(2-p-ethoxyphenylhydrazide).

Following the procedure of Example 7, but substituting 4-methyl D-aspartate and 4-methyl D,L-aspartate for 4-methyl L-aspartate, there are obtained: (a) D-N-carboallyloxyaspartic acid 4-(2-p-ethoxyphenylhydrazide) and D-aspartic acid 4-(2-p-ethoxyphenylhydrazide), and (b) D,L - N - carboallyloxyaspartic acid 4-(2-p-ethoxyphenylhydrazide) and D,L-aspartic acid 4-(2-p-ethoxyphenylhydrazide), respectively.

EXAMPLE 8.—3,3-DIMETHYLASPARTIC ACID 4-(2-m-PROPOXYPHENYLHYDRAZIDE)

A. *N-tosyl-3,3-dimethylaspartic acid 4-(2-m-propoxy phenylhydrazide)*

In the same manner as shown in Example 1, parts A, B and C, N-tosyl-3,3-dimethylaspartic acid 4-(2-m-propoxyphenylhydrazide) is prepared by using p-toluenesulfonyl chloride, 4-methyl 3,3-dimethylaspartate, and m-propoxyphenylhydrazine instead of benzyl chloroformate, 5-methyl L-glutamate and phenylhydrazine, respectively.

B. *3,3-dimethylaspartic acid 4-(2-m-propoxyphenylhydrazide)*

N - tosyl - 3,3 - dimethylaspartic acid 4-(2-m-propoxyphenylhydrazide) is reacted with sodium and liquid ammonia in accordance with the procedure described in J. Amer. Chem. Soc. 79, 639–44, 1957, to produce 3,3-dimethylaspartic acid 4-(2-m-propoxyphenylhydrazide).

Similarly, N-tosyl-3,3-dimtthylaspartic acid 4-(2-p-iodophenylhydrazide) and 3,3-dimethylaspartic acid 4-(2-p-iodophenylhydrazide) are prepared by utilizing p-iodophenylhydrazine instead of m-propoxyphenylhydrazine.

EXAMPLE 9.—2-PROPYLASPARTIC ACID 4-[2-(3,4,5-TRIMETHOXYPHENYL)HYDRAZIDE]

A. *N-carbobenzyloxy-2-propylaspartic acid 4-[2-(3,4,5-trimethoxyphenyl)hydrazide]*

In the same manner as shown in Example 1, Parts A, B and C, N-carbobenzyloxy-2-propylaspartic acid 4-[2-(3,4,5-trimethoxyphenyl)hydrazide] is prepared by using 4-methyl 2-propylaspartic and 3,4,5-trimethoxyphenylhydrazine instead of 5-methyl L-glutamate and phenylhydrazine, respectively.

B. *2-propylaspartic acid 4-[2-(3,4,5-trimethoxyphenyl)hydrazide]*

In the same manner as shown in Example 1, Part D, 2-propylaspartic acid 4-[2-(3,4,5-trimethoxyphenyl)hydrazide] is prepared by using N-carbobenzyloxy-2-propylaspartic acid 4-[2-(3,4,5-trimethoxyphenyl)hydrazide] instead of N-carbobenzyloxyglutamic acid 5-(2-phenylhydrazide).

EXAMPLE 10.—3-BUTYLASPARTIC ACID 4-(2-p-ETHYLPHENYLHYDRAZIDE)

A. *N-carbobenzyloxy-3-butylaspartic acid 4-(2-p-ethylphenylhydrazide)*

In the same manner as shown in Example 1, Parts A, B and C, N-carbobenzyloxy-3-butylaspartic acid 4-(2-p-ethylphenylhydrazide) is prepared by using 4-methyl 3-butylaspartate and p-ethylphenylhydrazine instead of 5-methyl L-glutamate and phenylhydrazine, respectively.

B. *3-butylaspartic acid 4-(2-p-ethylphenylhydrazide)*

In the same manner as shown in Example 1, Part D, 3-butylaspartic acid 4-(2-p-ethylphenylhydrazide) is prepared by using N-carbobenzyloxy-3-butylaspartic acid 4-(2-p-ethylphenylhydrazide) instead of L-N-carbobenzyloxyglutamic acid 5-(2-phenylhydrazide).

EXAMPLE 11.—3-METHYLASPARTIC ACID 4-(2-p-PROPYLPHENYHYDRAZIDE)

A. *N-tosyl-3-methylaspartic acid 4-(2-p-propylphenylhydrazide)*

In the same manner as shown in Example 1, Parts A, B and C, N-tosyl-3-methylaspartic acid 4-(2-p-propylphenylhydrazide) is prepared by using p-toluenesulfonyl chloride, 4-methyl 3-methylaspartate, and p-propylphenyl hydrazine instead of benzyl chloroformate, 5-methyl L-glutamate, and phenylhydrazine, respectively.

B. *3methyaspartic acid 4-(2-p-propylphenylhydrazide)*

N-tosyl-3-methylaspartic acid 4-(2-p-propylphenylhydrazide) is reacted with sodium and liquid ammonia in accordance with the procedure described in J. Amer. Chem. Soc. 79, 639–44, 1957, to produce 3-methylaspartic acid 4-(2-p-propylphenylhydrazide).

EXAMPLE 12.—2-METHYLGLUTAMIC ACID 5-(2-p-BUTYLPHENYLHYDRAZIDE)

A. *N-carboallyloxy-2-methylglutamic acid 5-(2-p-butylphenylhydrazide)*

In the same manner as shown in Example 1, Parts A, B and C, N-carboallyloxy-2-methylglutamic acid 5-(2-p-butylphenylhydrazide) is prepared by using allyl chloroformate, 5-methyl 2-methyl-glutamate, and p-butylphenylhydrazine instead of benzyl chloroformate, 5-methyl L-glutamate, and phenylhydrazine, respectively.

B. *2-methylglumatic acid 5-(2-p-butylphenylhydrazide)*

N-carboallyloxy-2-methylglutamic acid 5-(2 - p - butylphenylhydrazide) is hydrogenolyzed in the presence of platinum oxide catalyst in acidified ethanol in accordance with the procedure described in J. Amer. Chem. Soc. 79, 637–39, 1957, to produce 2-methylglutamic acid 5-(2-p-butylphenylhydrazide).

EXAMPLE 13.—3-METHYLGLUTAMIC ACID 5-(2-o-ISOPROPYLPHENYLHYDRAZIDE)

A. *N-carboallyloxy-3-methylglutamic acid 5-(2-o-isopropylphenylhydrazide)*

In the same manner as shown in Example 1, Parts A, B and C, N-carboallyloxy-3-methylglutamic acid 5-(2-o-isopropylphenylhydrazide) is prepared by using allyl chloroformate, 5-methyl 3-methylglutamate, and o-isopropylphenylhydrazine instead of benzyl chloroformate, 5-methyl L-glutamate, and phenylhydrazine, respectively.

B. *3-methylglutamic acid 5-(2-o-isopropylphenylhydrazide)*

N-carboallyloxy-3-methylglutamic acid 5-(2-o-isopropylphenylhydrazide) is hydrogenolyzed in the presence of platinum oxide catalyst in acidified ethanol in accordance with the procedure described in J. Amer. Chem. Soc. 79, 637–39, 1957, to produce 3-methylglutamic acid 5-(2-o-isopropylphenylhydrazide).

EXAMPLE 14.—4-METHYLGLUTAMIC ACID 5-(2-PHENYLHYDRAZIDE)

A. *N-tosyl-4-methylglutamic acid 5-(2-phenylhydrazide)*

In the same manner as shown in Example 1, Parts A, B and C, N-tosyl-4-methylglutamic acid 5-(2-phenylhydrazide) is prepared by using p-toluenesulfonyl chloride and 5-methyl 4-methylglutamate instead of benzyl chloroformate and 5-methyl L-glutamate, respectively.

B. *4-methylglutamic acid 5-(2-phenylhydrazide)*

N-tosyl-4-methylglutamic acid 5-(2-phenylhydrazide) is reacted with sodium and liquid ammonia in accordance with the procedure described in J. Amer, Chem, Soc. 79, 639-44, 1957, to produce 4-methylglutamic acid 5-(2-phenylhydrazide).

EXAMPLE 15.—2-AMINOHEXANEDIOIC ACID 6-(2-p-CHLOROPHENYLHYDRAZIDE)

A. *N-carboallyloxy-2-aminohexanedioic acid 6-(2-p-chlorophenylhydrazide)*

In the same manner as shown in Example 1, Parts A, B and C, N-carboallyloxy-2-aminohexanedioic acid 6-(2-p-chlorophenylhydrazide) is prepared by using allyl chloroformate, 6-methyl 2-aminohexanedioate, and p-chlorophenylhydrazine instead of benzyl chloroformate, 5-methyl L-glutamate and phenylhydrazine, respectively.

B. *2-aminohexanedioic acid 6-(2-p-chlorophenylhydrazide)*

N-carboallyloxy-2-aminohexanedioic acid 6-(2-p-chlorophenylhydrazide) is hydrogenolyzed in the presence of platinum oxide catalyst in acidified ethanol in accordance with the procedure described in J. Amer. Chem. Soc. 79, 637–39, 1957, to produce 2-aminohexanedioic acid 6-(2-p-chlorophenylhydrazide).

Similarly, N-carboallyloxy-2-aminohexanedioic acid 6-(2-o-ethylphenylhydrazide), 2-aminohexanedioic acid 6-(2-o-ethylphenylhydrazide); N-carboallyloxy-2-aminohexanedioic acid 6-(2-m-propoxyphenylhydrazide), 2-aminohexanedioic acid 6-(2-m-propoxyphenylhydrazide); N-carboallyloxy-2-aminohexanedioic acid 6-(2-m-fluorophenylhydrazide) and 2-aminohexanedioic acid 6-(2-m-fluorophenylhydrazide) are prepared by substituting o-ethylphenylhydrazine, m-propoxyphenylhydrazine, and m-fluorophenylhydrazine for p-chlorophenylhydrazine.

Substituting benzyl chloroformate and p-toluenesulfonyl chloride for allyl chloroformate results in the production of N-carbobenzyloxy-2-aminohexanedioic acid 6-(2-p-chlorophenylhydrazide), N-tosyl-2-aminohexanedioic acid 6-(2-p-chlorophenylhydrazide); N-carbobenzyloxy-2-aminohexanedioic acid 6-(2-o-ethylphenylhydrazide), N-tosyl-2-aminohexanedioic acid 6-(2-o-ethylphenylhydrazide); N-carbobenzyloxy-2-aminohexanedioic acid 6-(2-m-propoxyphenylhydrazide), N-tosyl-2-aminohexanedioic acid 6-(2-m-propoxyphenylhydrazide); N-carbobenzyloxy-2-aminohexanedioic acid 6-(2-m-fluorophenylhydrazide) and N-tosyl-2-aminohexanedioic acid 6-(2-m-fluorophenylhydrazide).

EXAMPLE 16.—2-AMINOHEPTANEDIOIC ACID 7-(2-p-METHYLOLPHENYLHYDRAZIDE)

A. *N-carboallyloxy-2-aminoheptanedioic acid 7-(2-p-methylolphenylhydrazide)*

Following the procedure of Example 1, Parts A and B, but substituting allyl chloroformate and 7-methyl 2-aminoheptanedioate for benzyl chloroformate and 5-methyl L-glutamate, respectively, and using the resulting cold ether solution of N-carboallyloxy-2-aminoheptanedioic acid 7-azide in the procedure of Example 3, Part D, N-carboallyloxy-2-aminoheptanedioic acid 7-(2-p-methylolphenylhydrazide) is obtained.

B. *2-aminoheptanedioic acid 7-(2-p-methylolphenylhydrazide)*

N-carboallyloxy-2-aminoheptanedioic acid 7-(2-p-methylolphenylhydrazide) is hydrogenolyzed in the presence of platinum oxide catalyst in acidified ethanol in accordance with the procedure described in J. Amer. Chem. Soc. 79, 637–39, 1957, to produce 2-aminoheptanedioic acid 7-(2-p-methylolphenylhydrazide).

Similarly, N-carboallyloxy-2-aminoheptanedioic acid 7-(2-p-tolylhydrazide), 2-aminoheptanedioic acid 7-(2-p-tolylhydrazide); N-carboallyloxy-2-aminoheptanedioic acid 7-(2-p-propoxyphenylhydrazide), 2-aminoheptanedioic acid 7-(2-p-propoxyphenylhydrazide); N-carboallyloxy-2-aminoheptanedioic acid 7-(2-p-chlorophenylhydrazide) and 2-aminoheptanedioic acid 7-(2-p-chlorophenylhydrazide) are prepared by utilizing p-tolylhydrazine, p-propoxyphenylhydrazine and p-chlorophenylhydrazine instead of p-methylolphenylhydrazine.

Substituting benzyl chloroformate and p-toluenesulfonyl chloride for allyl chloroformate results in the production of N-carbobenzyloxy-2-aminoheptanedioic acid 7-(2-p-methylolphenylhydrazide), N-tosyl-2-aminoheptanedioic acid 7-(2-p-methylolphenylhydrazide); N-carbobenzyloxy-2-aminoheptanedioic acid 7-(2-p-tolylhydrazide), N-tosyl-2-aminoheptanedioic acid 7-(2-p-tolylhydrazide); N-carbobenzyloxy-2-aminoheptanedioic acid 7-(2-p-propoxyphenylhydrazide), N-tosyl-2-aminoheptanedioic acid 7-(2-p-propoxyphenylhydrazide); N-carbobenzyloxy-2-aminoheptanedioic acid 7-(2-p-chlorophenylhydrazide) and N-tosyl-2-aminoheptanedioic acid 7-(2-p-chlorophenylhydrazide).

EXAMPLE 17.—2-AMINOOCTANEDIOIC ACID 8-(2-m-CARBOXYPHENYLHYDRAZIDE)

A. *N-carbobenzyloxy-2-aminooctanedioic acid 8-(2-m-carboxyphenylhydrazide)*

In the same manner as shown in Example 1, Parts A, B and C, N-carbobenzyloxy-2-aminooctanedioic acid 8-(2-m-carboxyphenylhydrazide) is prepared by using 8-methyl 2-aminooctanedioate and m-carboxyphenylhydrazine instead of 5-methyl L-glutamate and phenylhydrazine, respectively.

B. *2-aminooctanedioic acid 8-(2-m-carboxyphenylhydrazide)*

In the same manner as shown in Example 1, Part D, 2-aminooctanedioic acid 8-(2-m-carboxyphenylhydrazide) is prepared by using N-carbobenzyloxy-2-aminooctanedioic acid 8-(2-m-carboxyphenylhydrazide) instead of L-N-carbobenzyloxyglutamic acid 5-(2-phenylhydrazide).

Similarly, N-carbobenzyloxy-2-aminooctanedioic acid 8-(2-p-ethylphenylhydrazide), 2-aminooctanedioic acid 8-(2-p-ethylphenylhydrazide); N-carbobenzyloxy-2-aminooctanedioic acid 8-(2-m-butoxyphenylhydrazide), 2-aminooctanedioic acid 8-(2-m-butoxyphenylhydrazide); N-carbobenzyloxy-2-aminooctanedioic acid 8-(2-o-chlorophenylhydrazide), 2-aminooctanedioic acid 8-(2-o-chlorophenylhydrazide) are prepared by utilizing p-ethylphenylhydrazine, m-butoxyphenylhydrazine, and o-chlorophenylhydrazine instead of m-carboxyphenylhydrazine.

Substituting allyl chloroformate and p-toluenesulfonyl chloride for benzyl chloroformate results in the production of N-carboallyloxy-2-aminooctanedioic acid 8-(2-m-carboxyphenylhydrazide), N-tosyl-2-aminooctanedioic acid 8-(2-m-carboxyphenylhydrazide); N-carboallyloxy-2-aminooctanedioic acid 8-(2-p-ethylphenylhydrazide), N-tosyl-2-aminooctanedioic acid 8-(2-ethylphenylhydrazide); N-carboallyloxy-2-aminooctanedioic acid 8-(2-m-butoxyphenylhydrazide), N-tosyl-2-aminooctanedioic acid 8-(2-m-butoxyphenylhydrazide); N-carboallyloxy-2-aminooctanedioic acid 8-(2-o-chlorophenylhydrazide) and N-tosyl-2-aminooctanedioic acid 8-(2-o-chlorophenylhydrazide).

EXAMPLE 18.—2-AMINONONANEDIOIC ACID 9-(2-m-IODOPHENYLHYDRAZIDE)

A. *N-tosyl-2-aminononanedioic acid 9-(2-m-iodophenylhydrazide)*

In the same manner as shown in Example 1, Parts A, B and C, N-tosyl-2-aminononanedioic acid 9-(2-m-iodophenylhydrazide) is prepared by using p-toluenesulfonyl chloride, 9-methyl 2-aminononanedioate, and m-iodophenylhydrazine instead of benzyl chloroformate, 5-methyl L-glutamate, and phenylhydrazine, respectively.

B. *2-aminononanedioic acid 9-(2-m-iodophenylhydrazide)*

N-tosyl-2-aminononanedioic acid 9-(2-m-iodophenylhydrazide) is reacted with sodium and liquid ammonia in accordance with the procedure described in J. Amer. Chem. Soc. 79, 639–44, 1957, to produce 2-aminononanedioic acid 9-(2-m-iodophenylhydrazide).

Similarly, N-tosyl-2-aminononanedioic acid 9-(2-p-propylphenylhydrazide), 2-aminononanedioic acid 9-(2-p-propylphenylhydrazide); N-tosyl-2-aminononanedioic acid 9-(2-o-butoxyphenylhydrazide), 2-aminononanedioic acid 9-(2-o-butoxyphenylhydrazide); N-tosyl-2-aminononanedioic acid 9-(2-p-chlorophenylhydrazide) and 2-aminononanedioic acid 9-(2-p-chlorophenylhydrazide) are prepared by utilizing p-propylphenylhydrazine, o-butoxyphenylhydrazine, and p-chlorophenylhydrazine instead of m-iodophenylhydrazine.

Substituting benzyl chloroformate and allyl chloroformate for p-toluenesulfonyl chloride results in the production of N-carbobenzyloxy-2-aminononanedioic acid 9-(2-m-iodophenylhydrazide), N-carboallyloxy-2-aminononanedioic acid 9-(2-m-iodophenylhydrazide); N-carbobenzyloxy-2-aminononanedioic acid 9-(2-p-propylphenylhydrazide), N-carboallyloxy-2-aminononanedioic acid 9-(2-p-propylphenylhydrazide); N-carbobenzyloxy-2-aminononanedioic acid 9-(2-o-butoxyphenylhydrazide), N-carboallyloxy-2-aminononanedioic acid 9-(2-o-butoxyphenylhydrazide); N-carbobenzyloxy-2-aminononanedioic acid 9-(2-p-chlorophenylhydrazide) and N-carboallyloxy-2-aminononanedioic acid 9-(2-p-chlorophenylhydrazide).

EXAMPLE 19.—2-AMINODECANEDIOIC ACID 10-(2-p-METHOXYPHENYLHYDRAZIDE)

A. *N-tosyl-2-aminodecanedioic acid 10-(2-p-methoxyphenylhydrazide)*

In the same manner as shown in Example 1, Parts A, B and C, N-tosyl-2-aminodecanedioic acid 10-(2-p-methoxyphenylhydrazide) is prepared by using p-toluenesulfonyl chloride, 10-methyl 2-aminodecanedioate, and p-methoxyphenylhydrazine instead of benzyl chloroformate, 5-methyl L-glutamate, and phenylhydrazine, respectively.

B. *2-aminodecanedioic acid 10-(2-p-methoxyphenylhydrazide)*

N-tosyl-2-aminodecanedioic acid 10-(2-p-methoxyphenylhydrazide) is reacted with sodium and liquid ammonia in accordance with the procedure described in J. Amer. Chem. Soc. 79, 639–44, 1957, to produce 2-aminodecanedioic acid 10-(2-p-methoxyphenylhydrazide).

Similarly, N-tosyl-2-aminodecanedioic acid 10-(2-p-propylphenylhydrazide), 2-aminodecanedioic acid 10-(2-p-propylphenylhydrazide); N-tosyl-2-aminodecanedioic acid 10-(-2-p-carboxyphenylhydrazide), 2-aminodecanedioic acid 10-(2-p-carboxyphenylhydrazide; N-tosyl-2-aminodecanedioic acid 10-(2-p-iodophenylhydrazide) and 2-aminodecanedioic acid 10-(2-p-iodophenylhydrazide) are prepared by utilizing p-propylphenylhydrazide, p-carboxyphenylhydrazine, and p-iodophenylhydrazine instead of p-methoxyphenylhydrazine.

Substituting benzyl chloroformate and allyl chloroformate for p-toluenesulfonyl chloride results in the production of N-carbobenzyloxy-2-aminodecanedioic acid 10-(2 - p - methoxyphenylhydrazide), N-carboallyloxy-2-aminodecanedioic acid 10-(-2 - p - methoxyphenylhydrazide); N-carbobenzyloxy-2-aminodecanedioic acid 10-(2-p-propylphenylhydrazide), N-carboallyloxy-2-aminodecanedioic acid 10-(-2-p-propylphenylhydrazide); N-carbobenzyloxy-2-aminodecanedioic acid 10-(-2-p-carboxyphenylhydrazide), N-carboallyloxy-2-aminodecanedioic acid 10-(2-p-carboxyphenylhydrazide); N-carbobenzyloxy-2-aminodecanedioic acid 10-(2-p-iodophenylhydrazide) and N-carboallyloxy-2-aminodecanedioic acid 10-(2-p-iodophenylhydrazide).

We claim:

1. Compounds represented by the formula:

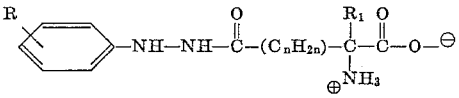

wherein R is selected from the group consisting of hydrogen, carboxy, halogen, alkyl of 1 to 4 carbon atoms, inclusive, and alkoxy of 1 to 4 carbon atoms, inclusive, $R_1$ is selected from the group consisting of hydrogen and alkyl of 1 to 4 carbon atoms, inclusive, and $n$ is an integer from zero to 7, inclusive.

2. L-glutamic acid 5-(2-phenylhydrazide).
3. L-glutamic acid 5-(2-p-tolylhydrazide).

References Cited by the Examiner
UNITED STATES PATENTS 3,162,680   12/1964   Biel _____ 260—518

OTHER REFERENCES

Houben-Weyl: Methoden der Organischen Chemie, vol. 11/2, p. 14 (1958).

Hofmann et al.: J. Amer. Chem. Soc., 74, pp. 470–72 (1952).

Levenberg: J. Amer. Chem. Soc., 83, p. 503 (1961).

R. K. JACKSON, *Primary Examiner.*

LORRAINE A. WEINBERGER, *Examiner.*

L. A. THAXTON, *Assistant Examiner.*